United States Patent [19]
Fabian et al.

[11] 4,094,219
[45] June 13, 1978

[54] SHEARING ARRANGEMENT

[75] Inventors: Wolfgang Fabian; Werner Plümer; Theodor Sevenich; Heribert Zehnter, all of Dortmund, Germany

[73] Assignee: Hoesch Werke Aktiengesellschaft, Dortmund, Germany

[21] Appl. No.: 797,062

[22] Filed: May 16, 1977

[30] Foreign Application Priority Data

May 20, 1976 Germany .............................. 2622558

[51] Int. Cl.² .......................... B26D 1/40; B26D 7/26
[52] U.S. Cl. ....................................... 83/345; 83/481; 83/571; 83/698; 83/859
[58] Field of Search ................. 83/345, 481, 673, 674, 83/698, 926 G, 859, 346, 347, 344, 286–292, 571, 572

[56] References Cited

U.S. PATENT DOCUMENTS

| | | | |
|---|---|---|---|
| 2,222,051 | 11/1940 | Tyrrell | 83/481 |
| 2,327,106 | 8/1943 | Hallden | 83/344 X |
| 2,674,310 | 4/1954 | Thornley | 83/289 X |
| 2,856,999 | 10/1958 | Wilhelm | 83/571 X |
| 3,302,503 | 2/1967 | Hornung | 83/345 X |
| 3,353,431 | 11/1967 | Mylo | 83/345 X |
| 3,895,549 | 7/1975 | Noda et al. | 83/345 |

*Primary Examiner*—Frank T. Yost
*Attorney, Agent, or Firm*—Max Fogiel

[57] ABSTRACT

A shearing arrangement for cutting moving bars in which two counter-rotating knife drums are rotatable in shear stands. These stands are spaced from each other and are located on a base plate. They are connected to each other above the knife drums by a disconnectable yoke. Both knife drums are mounted directly in the shear stands which are each of single-piece construction. The shear stands are inserted into the base plate and are connected to the base plate by quick-disconnect couplings. The quick-disconnect couplings between the shear stands and the base plate may be in the form of press rods, and the base plate may have lateral inclined guide surfaces or prisms for the shear stands. The knife drum is connected to its drive by an easily disengageable coupling which has a hydraulically shifted clutch sleeve.

10 Claims, 2 Drawing Figures

U.S. Patent  June 13, 1978  4,094,219

SHEARING ARRANGEMENT

BACKGROUND OF THE INVENTION

The present invention relates to a shear for cutting moving bars (strips) with two counter-rotating knife drums rotating in shear stands. The spaced shear stands are located on a base plate, and are connected with each other by a disconnectable yoke.

The shears before the last station of belt conveyers have the task of cropping the bars entering the last station at the front and rear end. They are preferably designed as drum shears. The drum shears are mounted in mountings which are held by shear stands with removable stand heads; the shear stands are connected above the knife shafts via a disconnectable yoke. Outside the shear stand, the knife shafts are connected with one another by a broad-faced gear. The drive operates via the lower knife shaft. The shear knife is replaced on the spot. With straight knives, it takes approximately two hours. With curved knives this time is increased to three hours when a pair of knives is used for the forward and rear cut. If plates or sheets are to be cut at the forward and rear end in opposite directions so that two pairs of knives are required, knife replacement takes six hours. The shear knives are replaced selectively in planned intervals. It frequently happens that with knife breakage the entire rolling mill must be stopped for a knife replacement. If it is necessary that the knife shafts or the inserts must be replaced, 36-48 hours are required. A knife shaft replacement always causes an extended stoppage, since stoppages of 36-48 hours cannot be included in the schedule.

In order to reduce the duration of stoppages, particularly for replacing the knife shafts, it has been proposed that the upper and lower knife shaft be mounted in common mountings. Again the replacement time is too long, because the replacement time is still 12 hours or more.

With another known shear design, the knife shafts with the mountings can be pulled out sideways from the shear stand. This reduces knife replacement to approximately 30 minutes if it can be planned. The shear is still built very expensively. The scrap removal is greatly impeded at times. An unplanned knife shaft replacement still takes approximately 90 minutes.

Accordingly, it is an object of the present invention to avoid the disadvantages of known devices or drum shears and to provide a shear with knife drums mounted in shear stands; this reduces the interference (down) times resulting from replacing the shear knives or knife drums to a minimum.

Another object of the present invention is to provide a shearing arrangement of the foregoing character which is substantially simple in construction and may be economically fabricated.

A further object of the present invention is to provide a shearing arrangement, as described, which may be readily maintained in service, and which has a substantially long operating life.

SUMMARY OF THE INVENTION

The objects of the present invention are achieved by providing that both knife drums are held in shear one-piece shear stands, and the shear stands are inserted in the base plate and connected to it by quick-disconnect mountings. The quick-disconnect mountings between shear stand and base plate are press rods. Also, the base plate has laterally inclined guide surfaces or prisms for the shear stands.

In a further improvement, it is advantageous if the drive-connected knife drum is connected by an easily disengaged clutch. The easily disengaged clutch is provided with a hydraulically shifted clutch sleeve.

The advantages of the present invention are as follows: To replace the shear knives or knife drums, shear stands with yoke and knife drums can be removed as one unit from the base plate and replaced quickly with a prepared assembly, thereby reducing down-time to a minimum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
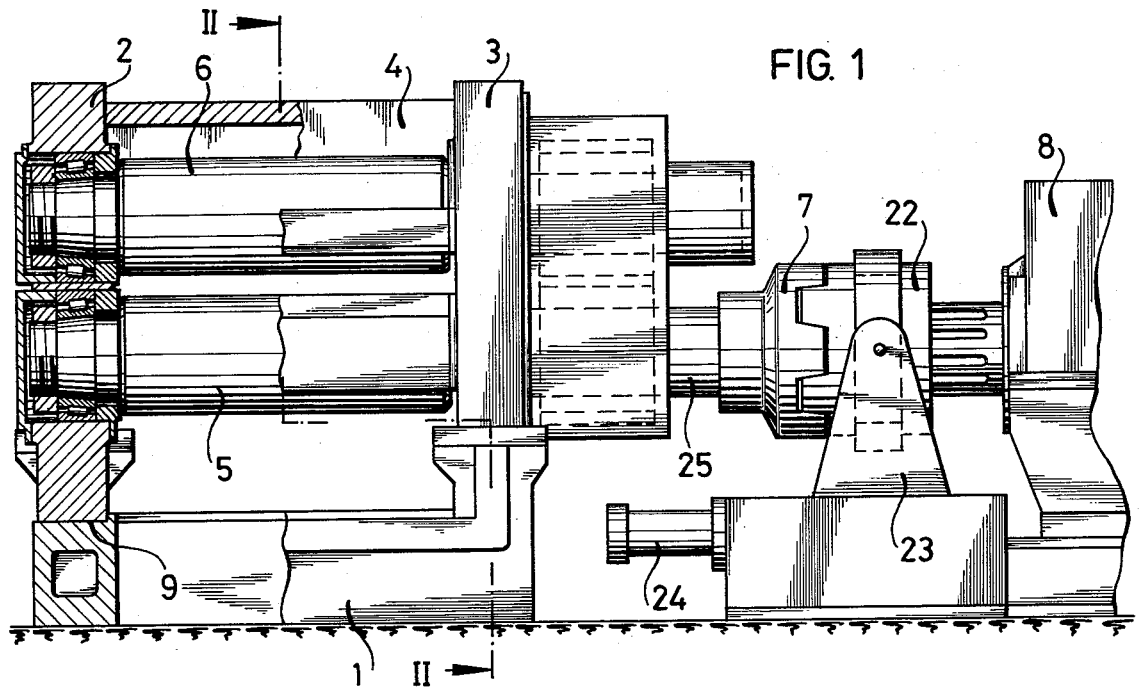
FIG. 1 shows a front view of the shears, with a partial sectional view.
Figure 2:
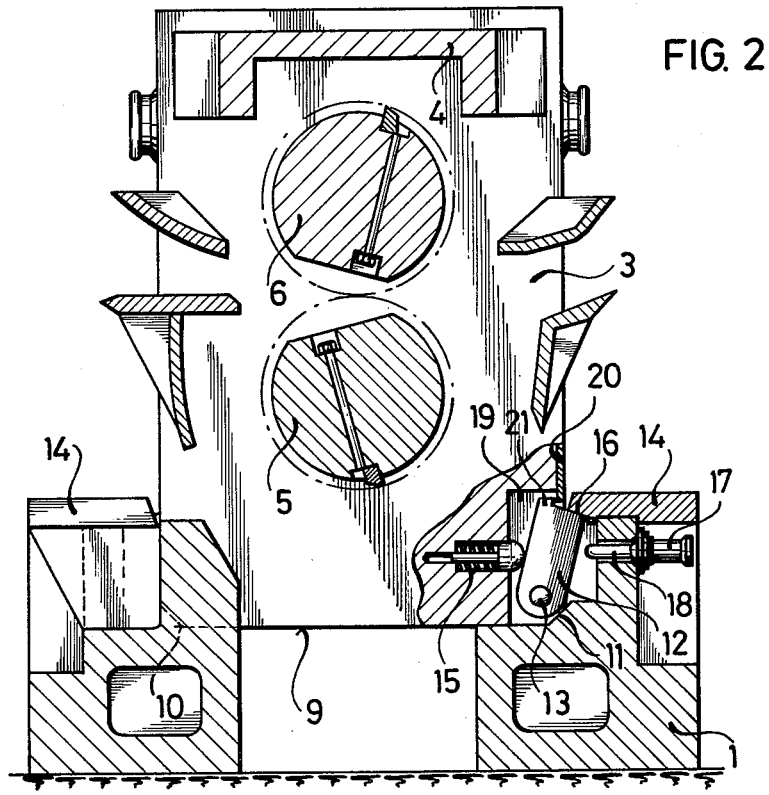
FIG. 2 shows a section taken along line II—II in FIG. 1.

Referring to FIGS. 1 and 2, the shears comprise a base plate 1, shear stands 2 and 3 connected detachably via a yoke, a lower knife drum 5 and an upper knife drum 6. Both knife drums 5, 6 are located directly in the shear stands 2, 3. The lower knife drum 5 is connected via a clutch 7 to drive 8. The shear stands 2, 3 rest with their lower surfaces 9 on the base plate 1, and are guided by inclined guide surfaces 10, 11 in the base plate. The shear stands 2, 3 are connected to the base plate 1 through press rods 12 which are rotatable around pins 13 in the shear stands 2, 3. Plates 14 are screwed to base plate 1 as counter bearings (abutments) for the press rods 12.

The press rods 12 are spread by springs 15 linked to the press rods. The contact surfaces 16 between the plates 14 and the press rods 12 are inclined towards each other in such a way that the spring force of springs 15 causes a bracing between the shear stands 2, 3 and the base plate 1 via the press rods 12. The press rod connection is released by means of hydraulic cylinders 17 which are located underneath the plates 14 in the base plate 1. The pistons 18 of hydraulic cylinders 17 during the disconnection, press the pressure rods 12 against the force of springs 15 into the recesses 19 of the shear stands 2, 3 so that the pressure rods 12 during lifting of the shear stands 2, 3, glide past plates 14. Upon insertion of the shear stands 2, 3, the press rods 12 are forced by the weight of the shear stands 2, 3 into the recesses, sliding past plates 14. After inserting the shear stands 2, 3, through the return travel of the pistons 18 of hydraulic cylinders 17, the press rods are spread apart. In order to prevent the press rods 12 from falling out of the recesses in the lifted-out condition, the shear stands 2, 3 have safety strips 20 which project downward beyond the upper edges of recesses 19. The press rods 12 with lugs 21 rest against these safety strips 20.

In order to further facilitate the simple lifting of the shear stands 2, 3 from the base plate 1, clutch 7 can be disengaged between the lower knife drum 5 and the drive 8. The easy disengagement is accomplished by disengaging the clutch 7 via a coupling sleeve 22 which can be pulled off laterally from trunnion 25 of the lower knife drum 5 by means of shifting device 23 and a hydraulic cylinder 24.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A shearing arrangement for cutting moving bars, comprising: shear stands; two counter-rotating knife drums rotatable in said shear stands; a base plate; said shear stands being spaced from each other and being located on said base plate; a disconnectable yoke, said shear stands being connected to each other above said knife drums by said disconnectable yoke; said two knife drums being mounted directly in said shear stands, each shear stand being a single piece member; quick-disconnect coupling means, said shear stands being inserted into said base plate and being connected to said base plate by said quick-disconnect coupling means; said coupling means engaging recesses at the bottom of said shear stands, said coupling means having elements brought together by weight of said shear stands when installing said shear stands into said base plate; spring means; said elements of said coupling means being spread by said spring means after said shear stands have been installed into said base plate, the spreading of said elements being increased by an upward force which can develop during a shearing process so that said shear stands are prevented from tilting in said base plate; and means in said base plate for relieving pressure on said elements before said shear stands are lifted from said base plate.

2. The shearing arrangement as defined in claim 1 wherein said quick-disconnect coupling means between said shear stands and said base plate comprises press rod means.

3. The shearing arrangement as defined in claim 1 wherein said base plate has lateral inclined guide surfaces for said shear stands.

4. The shearing arrangement as defined in claim 1 including drive means connected to one of said knife drums; and disengageable coupling means between said drive means and said one knife drum.

5. The shearing arrangement as defined in claim 4 wherein said disengageable coupling means has a hydraulically shifted clutch sleeve; a knife shaft trunnion; said clutch sleeve being shifted to an extent that the knife shaft trunnion is completely exposed for lifting the shear stands from said base plate.

6. The shearing arrangement as defined in claim 2 wherein said base plate has lateral inclined guide surfaces for said shear stands.

7. The shearing arrangement as defined in claim 1 wherein said base plate has oblique guide surfaces for said shear stands.

8. The shearing arrangement as defined in claim 2 wherein said base plate has oblique guide surfaces for said shear stands.

9. The shearing arrangement as defined in claim 1 wherein said quick-disconnect coupling means comprises press rod means; said base plate having lateral inclined guide surfaces for said shear stands; drive means connected to one of said knife drums; disengageable coupling means connected between one knife drum and said drive means and having a hydraulically shifted clutch sleeve.

10. A shearing arrangement as defined in claim 1 including drive means connected to one of said knife drums; disengageable coupling means between said drive means and said one knife drum; said quick-disconnect coupling means between said shear stands and said base plate comprising pressure applying means; said base plate having lateral inclined guide surfaces for said shear stands; said disengageable coupling means having a hydraulically-shifted clutch sleeve; a knife shaft trunnion; said clutch sleeve being shifted to an extent that the knife shaft trunnion is completely exposed for lifting the shear stands from said base plate.

* * * * *